United States Patent Office 2,953,524
Patented Sept. 20, 1960

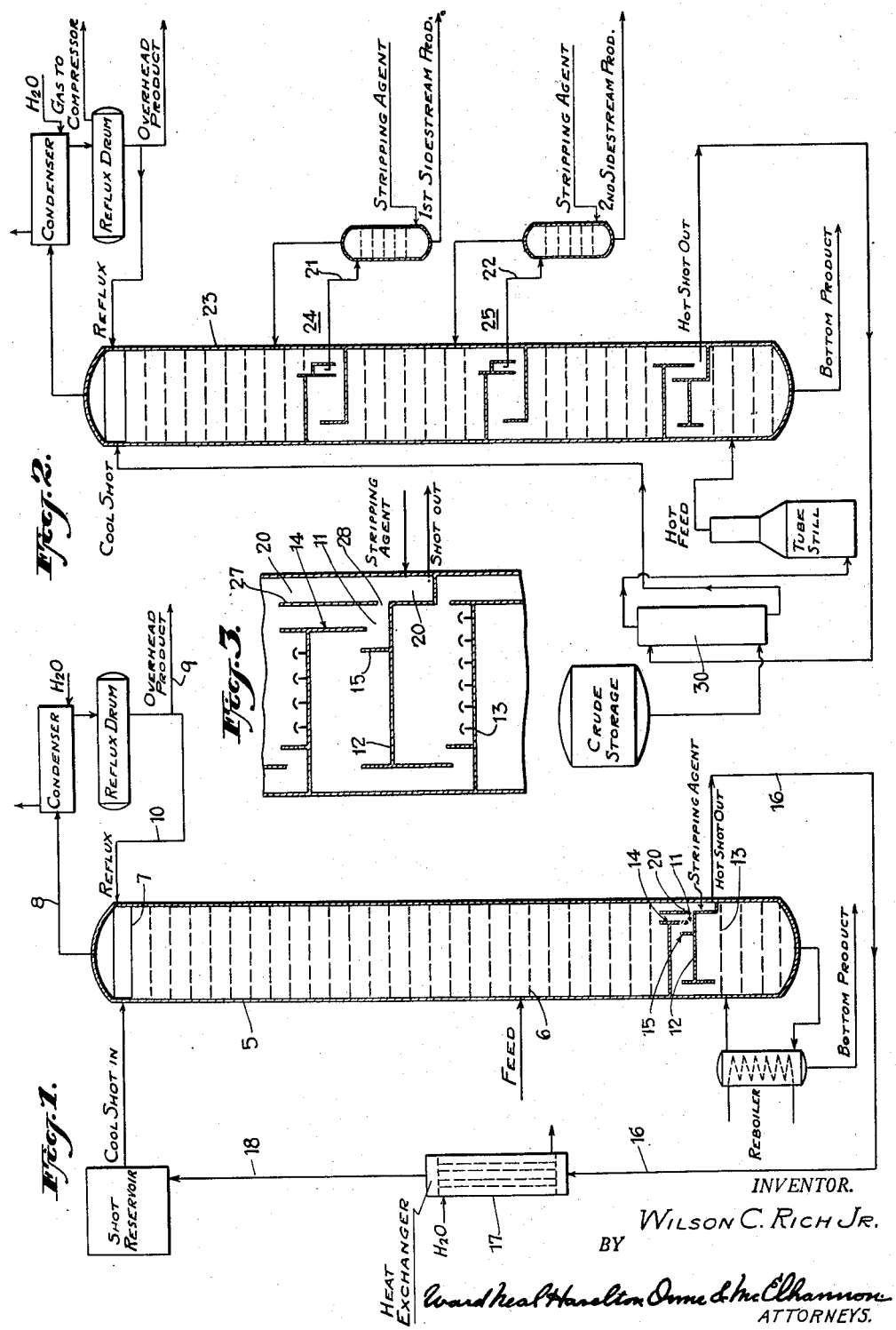

2,953,524

RECTIFICATION PROCESS USING COOL SHOT IN ADDITION TO REFLUX

Wilson C. Rich, Jr., 294 Old Tote Road, Mountainside, N.J.

Filed Apr. 25, 1956, Ser. No. 580,569

4 Claims. (Cl. 208—350)

This invention relates to improved and more efficient methods for rectifying liquid mixtures. More particularly, it relates to a method whereby the vapor load and the reflux load throughout the length of the rectifying column can be equalized. The present invention is especially well adapted to the rectification of multi-component mixtures as well as binary mixtures, and is particularly applicable to petroleum distillations.

In the accompanying drawing, Figure 1 is a flow diagram of the process of the present invention as applied to a simple rectification. Figure 2 is a similar diagram of a crude distillation unit employing the present invention. Figure 3 is an enlarged schematic diagram of the shot separating and stripping facility of the rectifying column of Fig. 1.

Rectification in its simplest terms is a distillation carried out in a manner such that the vapor rising through a column countercurrently contacts downflowing liquid called reflux at a plurality of points thereby effecting a separation of low and high boiling materials. The low boiling materials are concentrated in the top and the high boiling material in the bottom of the column. The process and the columns, including vapor-liquid contacting devices such as bubble cap plate or other types known in the art, in which it is carried out are well known. However, certain basic facts concerning theoretical and practical operation of rectifying columns is essential to an appreciation of the present invention. For example, cool reflux returned to the top of the column flows downwardly overflowing from plate to plate, thus condensing a portion of the vapors rising in the column. It is firmly established that for a given separation, or composition of the distillate, at fixed quantity and composition of feed, the design of a rectifying column is determined by reflux ratio, namely, the ratio of liquid reflux to distillate removed as product, and number of separation stages or plates. Column diameter and heat consumption are determined in large measure by the reflux ratio. Increases in reflux ratio decrease the number of plates for a given separation, but increase the diameter of the column and the heat consumption. On the other hand, decreases in reflux ratio necessitate a greater number of plates, but require a smaller diameter column, and the heat consumption is decreased.

For design purposes, an assumption is made that the reflux load or overflow from plate to plate throughout the column is constant, and that the vapor load at these points in the column is also constant. However, the portion of the condensed overhead product returned to the top plate of the column is usually at a temperature considerably lower than the normal temperature of the liquid already on the top plate; i.e., the reflux is subcooled. This causes greater than normal condensation of vapors entering and on this plate, with the result that the top plate serves to some extent as a partial condenser. The volume of reflux or overflow from the top to the next lower plate is thus greater than the volume of the cool reflux. Furthermore, the volume of vapor beneath the top plate is greater than that rising from the top plate. Accordingly, the diameter of the column must be based on the higher vapor volume beneath the top plate as estimated by a sectional heat balance.

Notwithstanding the above mentioned assumption regarding constant molal overflow through the column, it is well established as a practical matter that the vapor load decreases at progressively lower locations in the column above the feed plate, and increases below the feed plate so that another maximum vapor load appears above the bottom plate. This variation in vapor loading occurs because a portion of the cooler reflux is utilized for reducing the sensible heat of the upflowing vapors. In reducing the sensible heat of the vapors, parts of the cooling load available in the liquid overflow from plate to plate is dissipated, and the reflux load throughout the column consequently becomes less at progressively lower locations in the column but above the feed plate. Since column diameter is normally calculated to be adaquate at the point of maximum vapor load, it is apparent that over a major portion of its length the diameter of the column is greater than required. Usually it is not economical to vary the cross-sectional area of the column to fit the varying vapor load, but it is none the less a fact that more column volume is installed than is required. In some cases, however, and particularly in the petroleum field, the diameter of the column is varied in increments to correspond to vapor loading, particularly in crude distillation units where pump-around circuits markedly change the vapor loading at different locations in the column. Accordingly, a method whereby the vapor and reflux loads throughout the length of the column might be maintained substantially constant would be highly desirable, not only because a column of uniform diameter might then be entirely practicable, but also because the effective reflux ratio throughout the column could be substantially equal to that below the top plate, which would increase average reflux ratio throughout the column and permit the advantages attending increased reflux ratios in already existing columns.

The present invention is also applicable to rectification processes wherein several side stream products are withdrawn, as for example, in crude distillation units or more commonly, petroleum pipestills. The charge to the pipestill is normally heated in a furnace to vaporize the lighter portions of the crude petroleum which is then introduced near the bottom of the column. The vapor flows up the column, and at various locations portions thereof are condensed by downflowing liquid reflux. An overhead product is withdrawn, and in conventional pipestills, often as many as five so-called side stream products are also removed from the column at various levels. The cooling load required to condense these side stream products is supplied by reflux delivered to the top plate, and the heat balance of the pipestill is such that the quantity of reflux required at the top of the column is generally far in excess of that necessary to supply adaquate fractionation of overhead and side stream products. To eliminate this excess reflux requirement, and generally reduce vapor loading in modern pipestills, they are provided with one or more intermediate cooling circuits called pump-around circuits. More particularly, liquid is withdrawn from one or more points in the column, pumped through heat exchange and returned to the column above the point of withdrawal but at a lower temperature. These pump around circuits not only require additional equipment exterior of the column, but also extra plates in the pipestill to reheat the circulating liquid.

In accordance with the present invention, it is now possible to eliminate the difficulties above discussed inherent in the operation of conventional bubble cap or perforated tray columns including petroleum pipestills. I have found that finely divided solid material, hereinafter referred to as shot, introduced to the top of the column will flow downwardly along with the liquid in the column without impairing the normal functions of the bubble caps and without clogging the perforations in the plates. Clogging of the vapor passages between plates is avoided since the velocity of the rising vapor in the column prevents the solids from building up on or about these passages. Turbulence of the liquid on the plates caused by rising vapor bubbles prevents clogging of liquid passages by the shot, which flows across the plates and downwardly along with the liquid. A settling zone is provided near the bottom of the column for the collection and removal of shot deposited therein from the liquid which is caused to eddy above the settling zone.

In its broadest aspect the present invention thus contemplates the addition of cool shot to the column near its top, preferably onto the top plate, and withdrawal of the shot near the bottom of the column. In another aspect it contemplates cooling the shot withdrawn and returning cooled shot to the top of the column. As the cool shot flows downwardly, it is gradually heated by upflowing vapor. Because of the presence of the shot, a part of the reflux is now no longer used to remove sensible heat from the upflowing vapors, the sensible heat being instead given up to the shot. The net effect is to increase the average reflux ratio. As a result, vapor loading throughout the column is equalized, and since the maximum vapor load and average vapor load are essentially the same, the column is fully loaded throughout and no excess column volume is required. Thus, for a given separation, the diameter of the column in which the present invention is employed will be substantially less than the diameter of the column not employing the present invention. Alternatively, the column may be designed in accordance with the usual practice to accommodate the maximum vapor load beneath the top plate, in which case, the average reflux throughout the column will be higher with the present invention than in the conventional case without it, and it is then possible to reduce the number of plates. By means of the novel circulating shot stream for a given rectification, it is now possible to employ either a smaller diameter column or a column containing fewer plates or a combination of these.

Since the shot is removed from the column at either the highest or very nearly the highest temperature in the system, there is provided a source of high level heat available for heat exchange, which may, for example, be used to preheat the feed. In conventional rectifications, heat is removed from the column only by way of the bottom product and the overhead condensers, with the latter facilities operating at very low thermal efficiency. At constant feed with the method of the present invention, a considerable quantity of heat is removed by way of the shot with the result that the size of the overhead heat exchanger may be reduced. Since heat is removed at a high level in the shot withdrawn from the column, the average thermal efficiency of the entire system is improved. When the method of the present invention is applied to pipestills, removal of a substantial quantity of heat by means of the shot makes pump-around cooling circuits unnecessary, thus also affording substantial investment savings.

In addition to the aforementioned advantages of the present invention, the practical effect of this new method as applied to presently existing rectifying columns may be summed up as follows: At constant feed, it is now possible to obtain a more favorable separation in the overhead product, while at the same separation, it is possible to increase the quantity of the feed.

The shot employed herein is desirably inert with respect to the components of the mixture being rectified, and may be metal, metal oxide, non-metal, such as carbon in the form of coke, non-metal oxide, or a common refractory material such as glass, stone, sand, or mineral products. The amount of shot required in a given rectification will depend in part upon the heat capacity of the shot material. It is desirable that a material be chosen with a high specific heat in order to minimize the quantity of shot necessary to accomplish a given amount of cooling. The size of the shot particles in general is determined by considerations such as particle density, volume of liquid flow, and required area per pound to effect the desired heat removal, among others. As a practical matter, the shot is preferably of spherical shape in order to minimize attrition within the column and during cooling and recirculation. Shot diameters may range from about 100 to 2500 microns and even higher, depending upon required processing conditions.

The shot introduced to the column is described herein as cool. This is a relative term intended to indicate that the shot is at a temperature either below or approximating that of the contents of the column at the point of shot introduction. While it is within the scope of the present invention to introduce the shot at any point in the column and withdraw it at any lower point in the column, it will generally be introduced to the top plate at about or below the temperature of the reflux being introduced. It is also within the scope of the present invention to simultaneously introduce shot to the top plate and to one or more next lower plates, or at any location or combination of locations demanded by process considerations.

The present invention and the effect of the circulating shot stream will be clearly understood from the following sectional heat balance around a random section of a conventional rectifying column, wherein butane and hexane are being fractionated at about seven atmospheres. Heat and material balances show the following:

Table I

| Plate | Plate Temperature, °F. | Mols Vapor Leaving Plate | | | Mols Liquid Leaving Plate | | |
|---|---|---|---|---|---|---|---|
| | | $C_4$ | $C_6$ | Total | $C_4$ | $C_6$ | Total |
| A | 157 | | | | 34.8 | 3.9 | 38.7 |
| B | 170 | 88.7 | 4.8 | 93.5 | 26.9 | 8.3 | 35.2 |
| C | 184 | 80.8 | 9.2 | 90.0 | 21.0 | 12.3 | 33.3 |
| D | 193 | 74.9 | 13.2 | 88.1 | 17.8 | 14.5 | 32.3 |
| E | 201 | 71.7 | 15.4 | 87.1 | | | |

From Table I, it is apparent that the liquid leaving a plate (and consequently, the reflux ratio), decreases in moving down the column. The reason for this, of course, is that part of the available cooling from the reflux is required to remove sensible heat from the upflowing vapors. With the present invention it is possible to maintain the reflux constant or actually have it increase in moving down the column. This is so because the sensible heat of the upflowing vapors will be removed by transferring this heat to the downflowing shot. It is apparent that if in the above example the column is sized for the 93.5 mols of vapor leaving plate B, incorporation of shot will result in a higher average reflux ratio and less plates for the separation or, at the same average reflux ratio, shot will permit a reduction in column diameter.

The following shows the same fractionation with shot present:

Table II

| Plate | Plate Temperature, °F. | Mols Vapor Leaving Plate | | | Mols Liquid Leaving Plate | | |
|---|---|---|---|---|---|---|---|
| | | $C_4$ | $C_6$ | Total | $C_4$ | $C_6$ | Total |
| A | 157 | | | | 34.8 | 3.9 | 38.7 |
| B | 170 | 88.7 | 4.8 | 93.5 | 29.5 | 9.2 | 38.7 |
| C | 185 | 83.4 | 10.1 | 93.5 | 24.3 | 14.9 | 39.2 |
| D | 199 | 88.2 | 15.8 | 94.0 | | | |

Note that the shot has permitted essentially constant column loading. The higher average reflux resulted in essentially the same separation with one less stage than was required in the conventional case.

While the effect of the present invention upon future column design is not yet fully apparent, the invention may be carried out in existent columns with but slight modification to permit the introduction and withdrawal of the shot and the withdrawal of side stream liquid where necessary free from shot.

Referring to Fig. 1 of the drawing, it will be seen that in a conventional rectifying process, feed is introduced to the column 5 onto a plate 6 intermediate the ends of the column. Overhead product vapor is withdrawn from the column above top plate 7 through line 8 to the overhead condenser, which is often water cooled, condensed and the condensate stored in a reflux drum. A portion of the liquid is withdrawn from the reflux drum through line 9 and recovered as product, while the remaining portion is returned to the top plate 7 through line 10 as reflux. Cool solid shot is also introduced to top plate 7 from the shot reservoir and allowed to flow downwardly in the column along with the reflux liquid. Both shot and reflux remove sensible heat from the upflowing vapors and condense a portion of these vapors. A settling zone 11 associated with plate 12 is provided above the point of withdrawal of bottoms. Down-flowing liquid is directed into settling zone 11 by means of downcomer 14 and retained therein by the dam 15 on plate 12 thereby creating an eddy above settling zone 11 which permits entrained shot to settle. Referring to Fig. 3, a vertical baffle 27 is provided between downcomer 14 and the side of the column, which forms with the column side a stripping zone 20. Shot is withdrawn from settling zone 11 through opening 28 between plate 12 and baffle 27 to the stripping zone, where it is stripped of entrained liquid, then withdrawn through line 16 to heat exchanger 17, where it is cooled and thence through line 18 to the shot reservoir.

In the crude topping unit illustrated in Fig. 2, circulation and withdrawal of the shot is essentially the same as that described in connection with Fig. 1, except that at the point of withdrawal of the side streams 21 and 22 from column 23, the plates of the column are adapted as indicated generally at 24 and 25 to permit withdrawal of the side streams free from entrained shot. In the modification of the invention illustrated in Fig. 2, solid shot withdrawn from the column is passed through heat exchanger 30, which can be either a direct contactor or an indirect exchanger with a fluidized bed of shot, thus preheating the crude petroleum being withdrawn from storage for vaporization in the tube still. In the process as illustrated in Fig. 2, the shot leaving the column is not shown as being stripped. Obviously, the shot can be stripped as shown in Fig. 1 or stripped separately and externally of the column.

The method of the present invention is preferably carried out continuously, that is to say, shot is continuously introduced, withdrawn, cooled, conveyed to the top of the column and reintroduced. In connection with the heat exchange cooling of shot withdrawn from the column, attention is directed to my copending application Serial Number 327,979, filed December 26, 1952, now U.S. Patent No. 2,762,753, wherein methods are described employing a circulating shot stream.

Although certain particular embodiments of the invention are herein disclosed for purposes of explanation, various further modifications thereof, after study of this application, will be apparent to those skilled in the art to which the invention pertains. Reference should accordingly be had to the appended claims in determining the scope of the invention.

What is claimed is:

1. In a rectification process carried out in a multiple plate column, the improvement, whereby vapor loading throughout the column is substantially equalized, which comprises introducing near the top of said column a cool stream of finely divided solid shot which is substantially completely inert with respect to the components of the mixture undergoing rectification and which is adapted to flow downwardly along with the liquid in said column, allowing said shot to flow downwardly, inhibiting the further flow of said shot and collecting the same in said column at a point near the bottom thereof but above the point of withdrawal of bottom product, withdrawing said collected shot from the column, cooling the same and returning the cooled shot to the aforementioned point of introduction to the column.

2. A process as set forth in claim 1 wherein the shot withdrawn from the column is cooled in part at least through heat exchange with the liquid feed to the multiple plate column.

3. A process as set forth in claim 1 wherein the cool shot is introduced to the column adjacent the point of introduction of reflux thereto.

4. A process as set forth in claim 1 wherein at least one side stream product is withdrawn from the column at a point intermediate the point of introduction of shot and collection and withdrawal of shot, which comprises temporarily retarding the downward flow of liquid and shot adjacent the point of side stream withdrawal, permitting the retarded shot to settle by gravity from the liquid and withdrawing side stream product substantially free of shot from the liquid above the settled shot.

References Cited in the file of this patent

UNITED STATES PATENTS

| | | |
|---|---|---|
| 1,614,387 | Pereda | Jan. 11, 1927 |
| 1,752,455 | Peterkin | Apr. 1, 1930 |
| 2,453,205 | Docksey | Nov. 9, 1948 |
| 2,580,635 | Winter | Jan. 1, 1952 |
| 2,684,933 | Findlay | July 27, 1954 |
| 2,690,060 | Legatski | Sept. 28, 1954 |
| 2,762,753 | Rich et al. | Sept. 11, 1956 |

FOREIGN PATENTS

| | | |
|---|---|---|
| 587,774 | Great Britain | May 6, 1947 |